United States Patent
Striegler

(10) Patent No.: US 8,755,690 B2
(45) Date of Patent: Jun. 17, 2014

(54) SYSTEM AND METHOD FOR ADMINISTRATION OF DISPERSION COMPENSATION MODULES

(75) Inventor: Arne Striegler, München (DE)

(73) Assignee: Xieon Networks S.a.r.l., Luxembourg (LU)

( * ) Notice: Subject to any disclaimer, the term of this patent is extended or adjusted under 35 U.S.C. 154(b) by 410 days.

(21) Appl. No.: 13/201,237

(22) PCT Filed: Feb. 12, 2009

(86) PCT No.: PCT/EP2009/051614
§ 371 (c)(1),
(2), (4) Date: Oct. 24, 2011

(87) PCT Pub. No.: WO2010/091727
PCT Pub. Date: Aug. 19, 2010

(65) Prior Publication Data
US 2012/0039616 A1    Feb. 16, 2012

(51) Int. Cl.
*H04J 14/02* (2006.01)
*H04B 10/12* (2006.01)

(52) U.S. Cl.
USPC .............................. 398/81; 398/147; 398/149

(58) Field of Classification Search
CPC .......... H04B 10/2507; H04B 10/2513; H04B 10/2519
USPC ............................. 398/29, 81, 149, 151, 174
See application file for complete search history.

(56) References Cited

U.S. PATENT DOCUMENTS

| 4,953,939 A | 9/1990 | Epworth |
| 6,307,988 B1 * | 10/2001 | Eggleton et al. ................ 385/37 |
| 2002/0067522 A1 * | 6/2002 | Tanaka et al. ................. 359/110 |
| 2005/0078957 A1 * | 4/2005 | Hendow .......................... 398/33 |
| 2005/0105902 A1 | 5/2005 | Alavie et al. |

FOREIGN PATENT DOCUMENTS

GB    2161612 A    1/1986

OTHER PUBLICATIONS

Chang et al.: "40 Gbit/s payload and 2.5 Gbit/s label generation using optical carrier suppression and separation" Electronics Letters, IEE Stevenage, GB, vol. 40, No. 7, Apr. 1, 2004, XP006021734.

* cited by examiner

*Primary Examiner* — Daniel Dobson
(74) *Attorney, Agent, or Firm* — Nelson Mullins Riley & Scarborough LLP

(57) ABSTRACT

An optical network contains dispersion compensation modules with Fiber Bragg Gratings. A photo detector behind the Fiber Bragg Grating detects the not reflected rest of the gratings input signal and therefore the dispersion compensation modules input signal. This information is used to reduce the expenditure and to avoid errors of configuration or administration of the dispersion compensating subsystem of the optical network.

8 Claims, 5 Drawing Sheets

SYSTEM AND METHOD FOR ADMINISTRATION OF DISPERSION COMPENSATION MODULES

BACKGROUND OF THE INVENTION

Field of the Invention

This invention relates to component and system improvements and methods for a cost effective and error avoiding configuration and administration of dispersion compensation modules in optical communication networks.

Optical transmission systems, including optical fibre communication systems, have become an alternative for carrying voice and data at high speeds. In optical transmission systems, waveform degradation due to chromatic dispersion in the optical transmission medium can be problematic, particularly as transmission speeds continue to increase.

The chromatic dispersion of an optical fibre results from the fact that in transmission media such as glass optical waveguides, the refractive index of the media increases with a higher frequency of the optical signal. Therefore, higher frequency components of the optical signals will propagate slower within the media, while lower frequency signals propagate faster.

In digital optical communication systems, bit-spreading due to chromatic dispersion can be particularly problematic, as the shape of the waveform can be substantially impacted. The effect of this type of dispersion is a spreading of the original pulse in time, causing it to overflow in the time slot that has already been allotted to another bit. When the overflow becomes excessive, inter-symbol interference may result. This may result in an increase of the bit-error rate up to unacceptable levels. Also the maximum distance between an optical transmitter (OT) and an optical receiver (OR) is limited by the quality of the dispersion compensation.

For this reason, the control of the total chromatic dispersion in an optical communication system is essential, particularly in long distance and high-speed applications. In particular, it is necessary to reduce the total dispersion to a point where its contribution to the bit-error rate of the signal is acceptable.

To solve this problem, dispersion compensation modules (DCMs) have been developed. They commonly use pieces of optical fibre with a dispersion compensating material.

The amount of dispersion compensation depends on the composition of fibre types of the optical line over which the signal is transmitted. Since the signal power and the characteristics of the used optical fibres are both dependent on the wavelength of the signal, the dispersion has to be compensated individually for each transmit frequency using a different wavelength. Additionally, during the operation of an optical network (ON), the signals may be routed over different optical lines, or an optical line may be violated and thus change their optical characteristic.

All these cases require different amounts of dispersion compensation. For this purpose, also special tunable dispersion compensation modules as in the patents EP 1 022 824 and US 2002/0186929 have been developed. They must be connected to the other components, fed with diversion compensation parameters and configured and administrated within the optical network.

For a better understanding of the state of the art relating to the invention, the following figures are used:

FIG. 1 shows the usual topology of an optical network system with DCMs.

FIG. 2 shows a topology wherein the DCMs are arranged in an additional array or unit.

FIG. 3 shows a topology wherein couplers are used to detect if a DCM is in use.

In a standard topology (FIG. 1), the signals of some of the OTs are routed via a DCM (OT 1, 2, 4); some others are directly connected to an OR (OT 3, 5) because a dispersion compensation may not be necessary due to a short optical line (OL) distance.

The topology may also contain wave length multiplexers and demultiplexers in order to combine two or more wave length channels in different optical lines to one common optical line. Also such common optical lines with multiple wave lenght channels may contain DCMs. These are not shown in FIG. 1 for increasing the clarity of the topology.

When the DCMs are too large to fit onto the OT units and when many DCMs are to be used, it is useful to group the DCMs (FIG. 2), e.g. as an additional array or unit (1). In such a system, each OT may be connected to one of the DCMs (DCM 1 to 3) or may not be connected to a DCM (OT 3, OT 5). Other DCM of the DCM unit (1) will still be not in use (e.g. DCM 4). The necessary optimal dispersion compensation for the optical line is then adjusted within each used DCM by a regulator circuit.

To configure the whole system, it is necessary to inform the network element managing unit (NEMU) manually about which OT is connected to which DCM, since there is no electrical convection between the optical signal path of the DCMs and the NEMU. This can easily generate errors in the cabling or the manual configuration of the system, especially if the system consists of many OTs, DCMs or DCM units like in large network knots. If such errors occur, they may lead to high costs of non operation, error searching and reconfiguration of the system.

Some of the cost can be reduced if the NEMU has information about which of the DCMs is in use and which is not and also, which of the DCM groups has free capacity and which is completely used. To achieve that, couplers (CP) can be inserted between the DCMs and the ORs (FIG. 3). They can lead out a part of the optical signal of the DCM and generate an electrical signal to the NEMU if an optical signal occurs. Disadvantages are the costs and necessary spaces of these couplers and the fact that the power of the optical signal is diminished, which would reduce the maximum optical line distance or has to be compensated with a higher expenditure of components.

BRIEF SUMMARY OF THE INVENTION

The objective of this invention is to find a solution for a less expensive way to set up the configuration and avoid errors during installation and operation in optical networks which use DCMS.

This objective can be achieved by an optical system with the claimed features in conjunction with the claimed method.

The main idea of the invention is to avoid additional coupiers by adding a photo detector to the DCM which receives the part of the DCMs input signal which is not reflected back into the optical path, and to use this information for the administration of the optical network.

The new solution and their advantages will be explained in detail by help of FIGS. 4 to 6:

DESCRIPTION OF THE INVENTION

Figure 4:
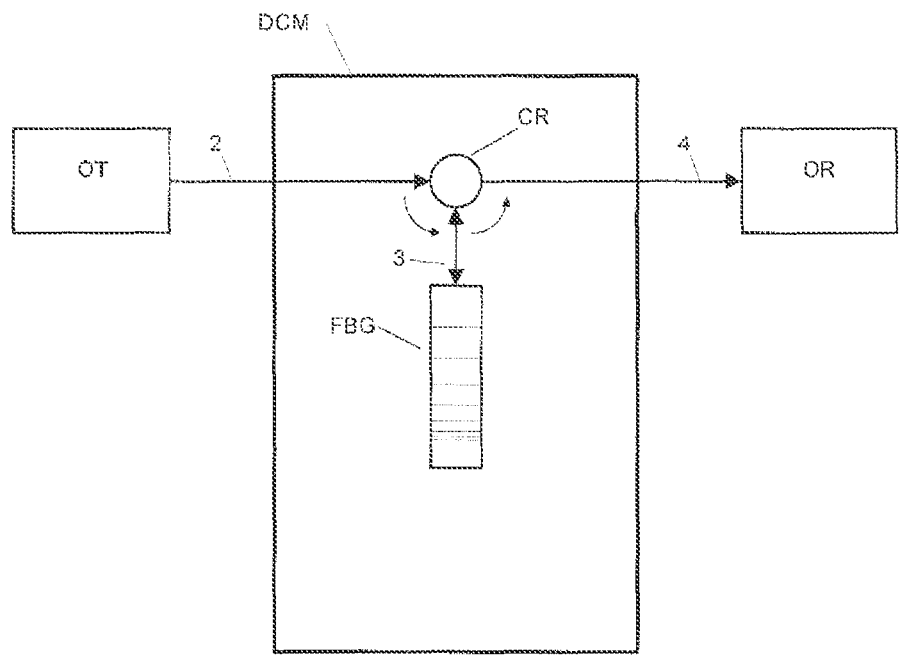
FIG. 4 shows a conventional DCM.

Starting point of the new solution is a DCM like depicted in FIG. 4. It shows schematically how dispersion compensation can be implemented. This implementation contains a Fibre Bragg Grating (FBG) which normally consists of a piece of optical fibre into which an interference filter is written by help of ultraviolet light. In the FBG the low frequency part (long wavelength) of its optical input signal (3) is reflected close to the input end of the grating, and the high frequency part (short wavelength) is reflected closer to the opposite end of the grating.

The additional propagation path that the high frequency part has to travel across the grating compensates for the difference in propagation time between the low and high frequency parts caused by the dispersion in the optical line. By various means, the characteristics of the FBG may be varied.

To use the FBG, the optical signal (2) of the optical transmitter (OT) is coupled to the first port of a three-port optical circulator (CR). The signal is then directed to the second port of the CR (3) where it is passed through the FBG for providing the dispersion compensating. The dispersion compensated signal reflected by the FBG is finally directed to a third port of the circulator which is connected to the optical line (4) leading to an optical receiver (OR).

Figure 1:
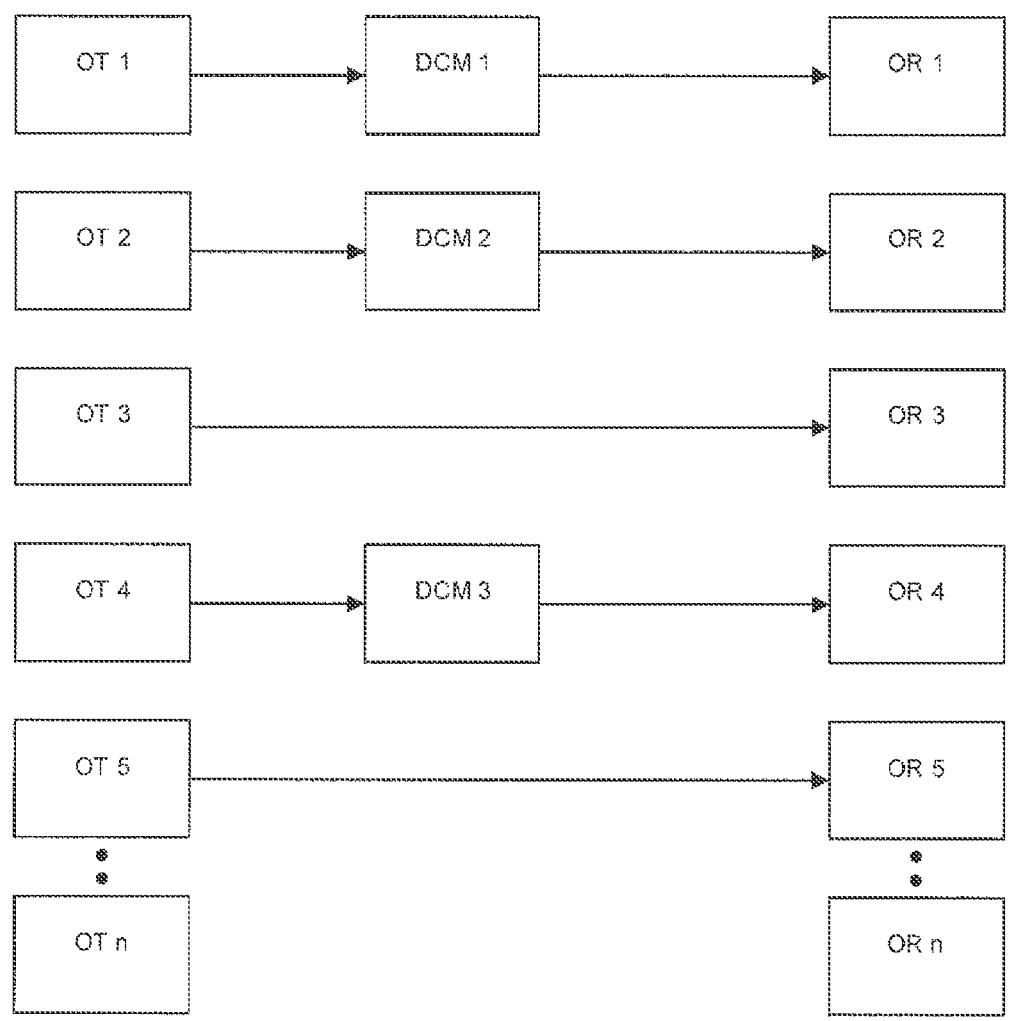
Figure 2:
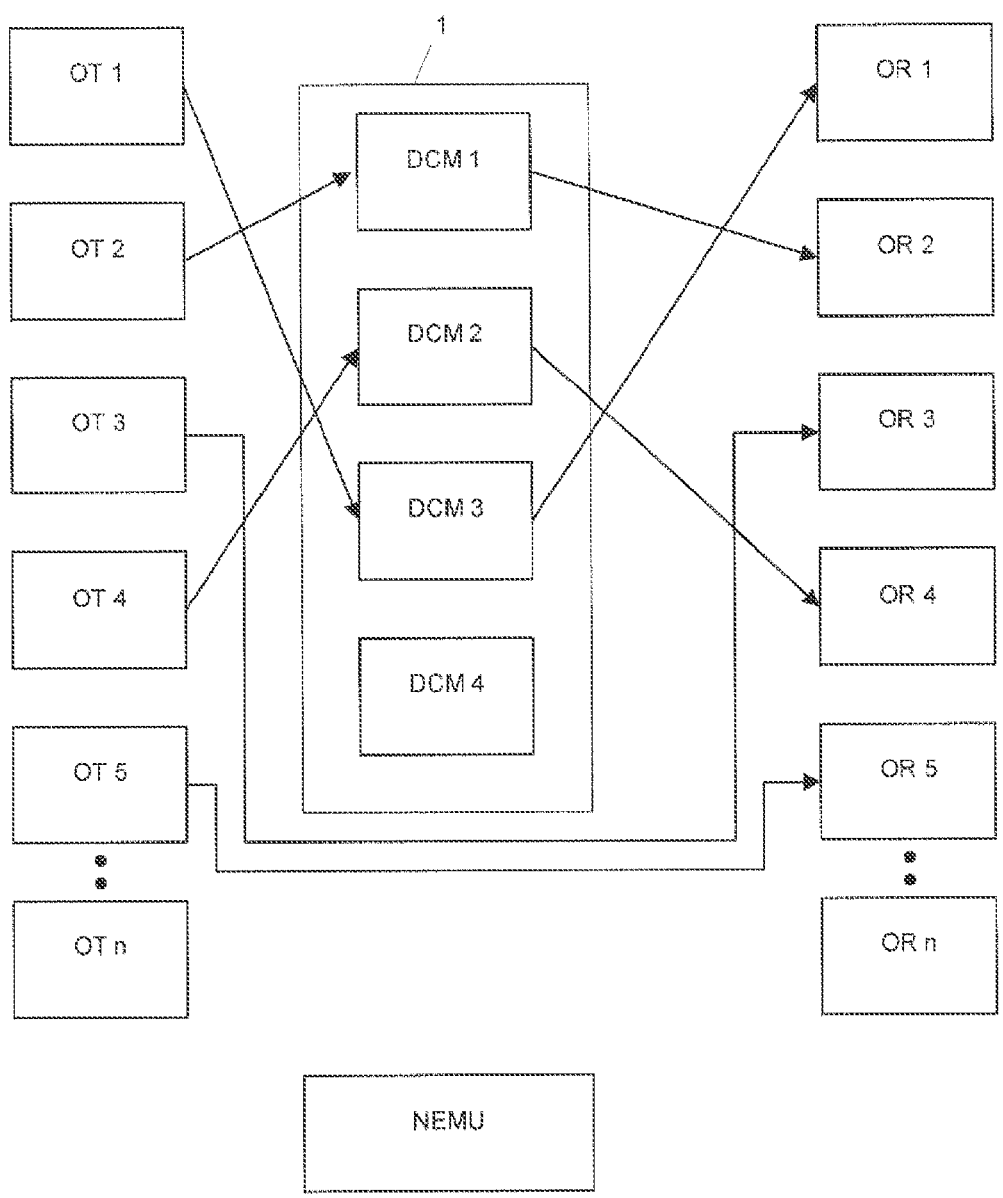
Figure 3:
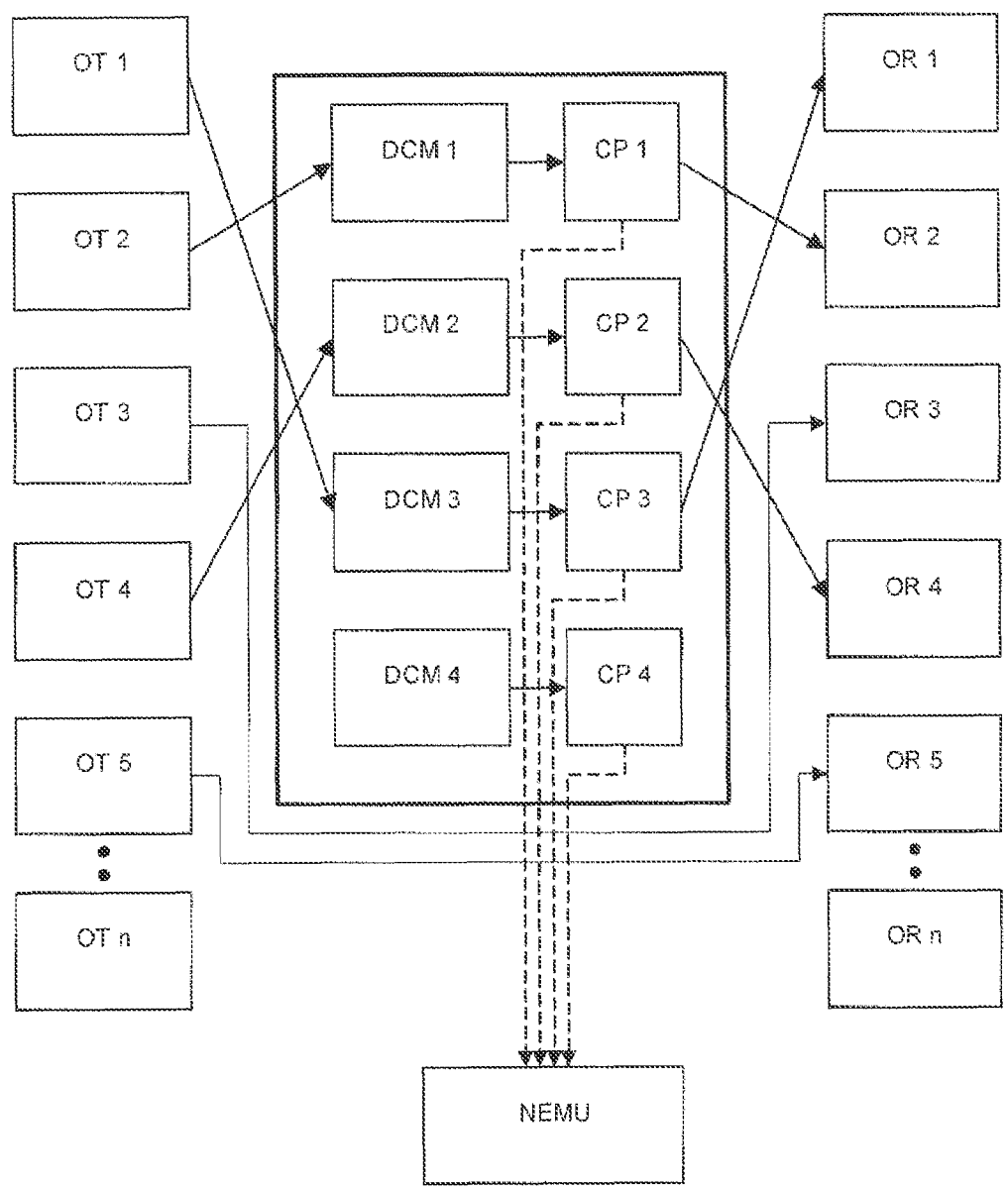
Figure 5:
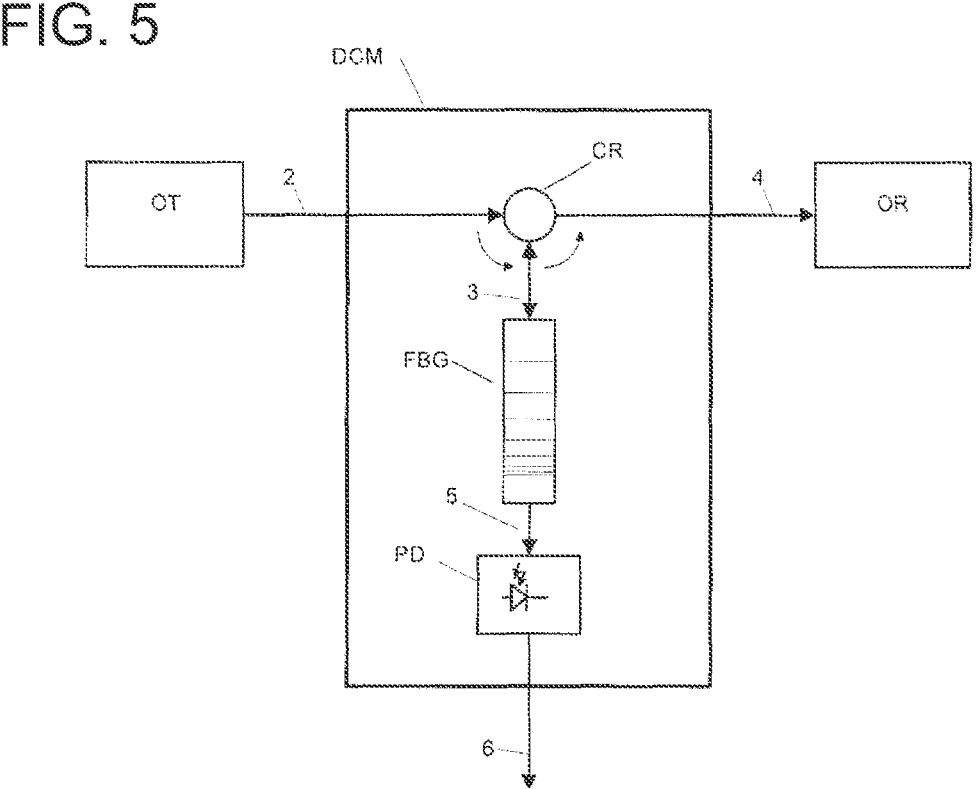
FIG. 5 shows a DCM with a photo detector.

The invention takes advantage of the effect that the reflection of an optical signal within the FBG fibre is not perfect. FIG. 5 shows how a part of the input signal (4) of the FBG can be detected at the far end of the FBG fibre (5) which is not connected to the circulator. This rest signal is led to a photo detector (PD), whose electrical output (6) will indicate if an optical signal at its input (5) exists or not. The photo detectors are technically simple and small so that they can be integrated in the DCM, in contrary to the coupiers in FIG. 3. Such a FBG based DCM with a photo detector may be used in any optical path to detect if the optical path has an active optical signal or not.

Figure 6:
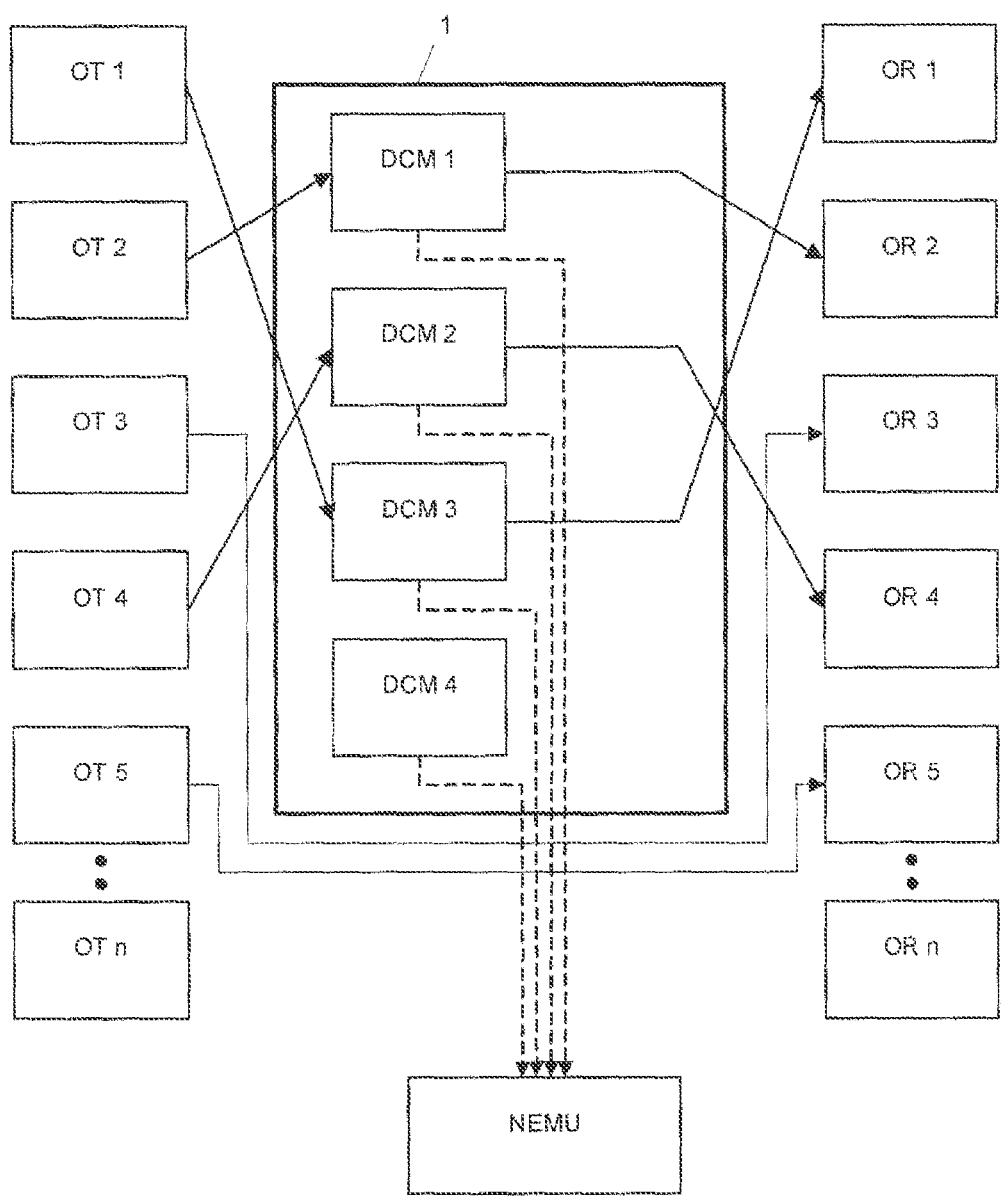
FIG. 6 shows a topology like FIG. 3 but with improved DCMs.

In FIG. 6 it is shown that the outputs of the photo detectors are connected with the NEMU, which is then able to detect which of the DCMs or DCM cards is in use or has free channels and thus help during the manual configuration of the system.

In further embodiments of the invention, the photo detector is not only able to detect if a signal exists or not, but can read and process its input signal. This feature can be used for an enhanced manual or even automatic configuration of the system by e.g. the following method:

- the output line of each OT is connected to any free DCM, if dispersion compensation is necessary,
- at the start of a configuration, the OTs generate data like a transmitter number or transmitter type to identify or characterize the OT,
- in each DCM the characterizing data are passed through the CR to the FBG. The not reflected rest of the signal with its characterizing data is then read by the PD and passed to the NEMU,
- at the start of a configuration, the NEMU reads all PD data of all DCMs in all groups of DCMs and registers which OT is connected to which DCM and which DCM or DCM group is still not used.

By this automated administration, cabling errors as well as manual configuration errors are completely avoided, because the assignment between OTs and DCMs is automatically detected.

The requirements for the photo detector are low, because only low data rates are necessary for the characterizing data.

Also the OTs need not to be changed, only their input has to be enriched by the characterizing data.

REFERENCES

CP Coupler
CR Circulator
DCM Dispersion Compensation Module
FBG Fibre Bragg Grating
NEMU Network Element Managing Unit
OL Optical Line
ON Optical Network
OR Optical Receiver
OT Optical Transmitter
PD Photo Detector

The invention claimed is:

1. An optical network system, comprising
   optical transmitters having output ports;
   dispersion compensation modules having input ports and output ports;
   optical receivers;
   optical lines interconnecting said optical transmitters, said dispersion compensation modules, and said optical receivers;
   wherein said output port of at least one of said optical transmitters is connected to said input port of a respective said dispersion compensation module, and said output port of said dispersion compensation module is connected to a respective said optical receiver, building an optical path in the optical network;
   wherein said dispersion compensation module includes:
      a circulator;
      a Fiber Bragg Grating disposed to reflect a portion of an input signal back into the optical path for compensating a chromatic dispersion of the optical path; and
      a photo detector disposed behind said Fiber Bragg Grating for receiving a portion of the input signal that is not reflected back into the optical path, said photo detector outputting a photo detector signal indicating information about the input signal into said dispersion compensation module; and
   at least one network element managing unit connected to receive from said dispersion compensation modules the photo detector signal.

2. The optical network system according to claim 1, wherein the information about the input signal is a content of the input signal to the Fiber Bragg Grating.

3. The optical network system according to claim 1, wherein said dispersion compensation modules are multiple dispersion compensation modules arranged in an array or in a unit and each of said dispersion compensation modules may be connected to the optical path.

4. A method of administering an optical network having an optical path, the method which comprises:
   providing a dispersion compensation module that includes:
      a circulator;
      a Fiber Bragg Grating disposed to reflect a portion of an input signal back into the optical path for compensating for chromatic dispersion of the optical path; and
      a photo detector disposed behind said Fiber Bragg Grating for receiving a portion of the input signal that is not reflected back into the optical path, said photo detector outputting a photo detector signal indicating information about the input signal;

providing a network element managing unit for reviewing the photo detector signal from the dispersion compensation module; and using the photo detector signal of the dispersion compensation module anywhere in the optical path to check whether or not the optical path has an optical signal.

5. A method of administering an optical network having an optical path, the method which comprises:

providing dispersion compensation modules, wherein each dispersion compensation module comprises:
a circulator;
a Fiber Bragg Grating disposed to reflect a portion of an input signal back into the optical path for compensating for chromatic dispersion of the optical path; and
a photo detector disposed behind said Fiber Bragg Grating for receiving a portion of the input signal that is not reflected back into the optical path, said photo detector outputting a photo detector signal indicating information about the input signal;

providing a network element managing unit for receiving the photo detector signal from each dispersion compensation nodule; and using the photo detector signal by the network element managing unit to check which of the dispersion compensation modules are connected or not connected to the optical path.

6. A method in an optical network according to claim 5, wherein the dispersion compensation modules are multiple dispersion compensation modules arranged in an array of a unit and each of the dispersion compensation modules may be connected to the optical path; and wherein the method further comprises using the photo detector signals with the network element managing unit to check which of the arrays or units have free dispersion compensation modules.

7. A method of administering an optical network, the method which comprises:

providing optical transmitters having output ports in the network system;

providing dispersion compensation modules, wherein each dispersion compensation module comprises:
a circulator;
a Fiber Bragg Grating disposed to reflect a portion of an input signal back into the optical path for compensating for chromatic dispersion of the optical path; and
a photo detector disposed behind said Fiber Bragg Grating for receiving a portion of the input signal that is not reflected back into the optical path, said photo detector outputting a photo detector signal indicating information about the input signal;
wherein the output port of at least one of the optical transmitters is connected to an input port of a respective dispersion compensation module, and an output port of the respective dispersion compensation compression module is connected to an optical receiver to create an optical path in the optical network;

providing a network element managing unit for receiving the photo detector signal from the dispersion compensation module; and enhancing the signals of the optical transmitters by identifying or characterizing data including a transmitter number or a transmitter type and using the information by a network element managing unit to register which optical transmitter is connected to which dispersion compensation module, dispersion compensation module array or unit.

8. The method according to claim 7, further comprising using the information to automatically configure a dispersion compensating subsystem of the optical network.

* * * * *